United States Patent
Zhang

(10) Patent No.: US 7,224,699 B2
(45) Date of Patent: May 29, 2007

(54) WIRELESS LOCAL AREA NETWORK ACCESS GATEWAY AND METHOD FOR ENSURING NETWORK SECURITY THEREWITH

(75) Inventor: Wenlin Zhang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 11/261,373

(22) Filed: Oct. 28, 2005

(65) Prior Publication Data

US 2006/0104233 A1 May 18, 2006

Related U.S. Application Data

(63) Continuation of application No. PCT/CN2004/001392, filed on Dec. 1, 2004.

(30) Foreign Application Priority Data

Dec. 8, 2003 (CN) ......................... 2003 1 0118238

(51) Int. Cl.
*H04L 12/28* (2006.01)
*H04L 12/66* (2006.01)
*G06F 15/16* (2006.01)

(52) U.S. Cl. ...................... 370/401; 370/352; 370/392; 726/13

(58) Field of Classification Search ................ 370/352, 370/338, 389, 392, 395.1, 401; 455/405–406, 455/410–411; 709/201, 203, 217–219, 249–250; 726/2–4, 11–13, 21

See application file for complete search history.

(56) References Cited

U.S. PATENT DOCUMENTS 6,128,298 A * 10/2000 Wootton et al. ............ 370/392

| | | | |
|---|---|---|---|
| 6,874,026 B2 * | 3/2005 | Maria et al. ................. | 709/225 |
| 2002/0129243 A1 * | 9/2002 | Nanjundiah ................. | 713/160 |
| 2004/0187033 A1 * | 9/2004 | Wang .......................... | 713/201 |
| 2004/0247126 A1 * | 12/2004 | McClellan ................... | 380/262 |

FOREIGN PATENT DOCUMENTS

| CN | 1423461 | 6/2003 |
|---|---|---|
| WO | WO 0076125 | 12/2000 |

OTHER PUBLICATIONS

International Search Report for PCT/CN2004/001392, Feb. 17, 2005.

* cited by examiner

*Primary Examiner*—Young T. Tse
(74) *Attorney, Agent, or Firm*—Marshall. Gerstein & Borun LLP

(57) ABSTRACT

A wireless local area network access gateway (WAG) includes a routing enforcement module and a charging module. The data packets sent via the WAG are outputted to the service authentication and authorization unit or packet data gateway (PDG) of WLAN or the WLAN UE after the forced route processing and collection of charging information. The WAG further includes a message filtering module for acquiring and storing packet filtering rules as well as discriminating, filtering and screening the data packets currently passing the WAG. Also disclosed is a method for ensuring network security by utilizing the WAG. With the disclosed WAG and method, data packets can be discriminated, filtered, and screened so as to prevent as much as possible illegal messages from interfering and threatening the network operation, prevent the transmission of illegal messages, improve the security of the network, and reduce the load of the network.

10 Claims, 4 Drawing Sheets

WIRELESS LOCAL AREA NETWORK ACCESS GATEWAY AND METHOD FOR ENSURING NETWORK SECURITY THEREWITH

CROSS-REFERENCES TO RELATED APPLICATIONS

This is a continuation of International Application No. PCT/CN2004/001392, which was filed on Dec. 1, 2004, and which, in turn, claimed the benefit of Chinese Patent Application No. 200310118238.6, which was filed on Dec. 8, 2003, the entire disclosures of which are hereby incorporated herein by reference.

BACKGROUND OF THE DISCLOSURE

1. Field of the Technology

The present invention relates to network security techniques, and particularly to a Wireless Local Area Network (WLAN) access gateway and the method for ensuring the network security by utilizing the WLAN Access Gateway (WAG).

2. Background of the Invention

As users' requirements on the wireless access rate are becoming higher and higher, WLAN which is able to provide a higher wireless access rate of data in a relatively small area has emerged as the times require. WLAN involves various kinds of techniques, the most extensively used technical standard of which is IEEE 802.11b, which uses the frequency band of 2.4 GHz and the data transmission rate of which is up to 11 Mbps. Other technical standards using the same frequency band include IEEE 802.11g and Bluetooth, where the data transmission rate of IEEE 802.11g is up to 54 Mbps. Other new standards of WLAN, such as IEEE 802.11a and ETSI BRAN Hiperlan2, use the frequency band of 5 GHz, and the transmission rate of which can be up to 54 Mbps as well.

Although WLAN involves various kinds of wireless access techniques, most WLAN techniques utilize IP data packets for data transmission. The specific WLAN access technique adopted by a wireless IP network is usually transparent to the upper IP level. Such a wireless IP network is usually configured with Access Points (AP) for implementing wireless access of user equipment (UE), and with controlling and connecting devices for implementing IP data transmission.

Along with the appearance and development of WLAN, the inter-working of WLAN with various wireless mobile communication networks, such as GSM, CDMA, WCDMA, TD-SCDMA, and CDMA2000 has becoming the focus of researches. In accordance with the 3 GPP (3rd Generation Partner Project) standards, a WLAN UE is not only able to connect with Internet and Intranet via the access network of WLAN, but also able to connect with the home network and the visited network of a 3 GPP system via the WLAN access network. To be specific, when accessing locally, the WLAN UE is able to connect to the 3 GPP home network via the WLAN access network, as shown in FIG. 2; when in the roaming case, the WLAN UE is able to connect to the visited network of the 3 GPP system via the WLAN access network. And as some entities of the 3 GPP visited network are connected with some corresponding entities of the 3 GPP home network, for instance, the 3 GPP Authentication, Authorization and Accounting (AAA) Proxy in the 3 GPP visited network is connected with the 3 GPP AAA Server in the 3 GPP home network, the WAG in the 3 GPP visited network is connected with the Packet Data Gateway (PDG) in the 3 GPP home network, and etc., as shown in FIG. 1. Where, FIG. 1 and FIG. 2 respectively illustrate the architecture of the inter-working network of WLAN system and 3 GPP system under roaming and non-roaming circumstances.

As shown in FIG. 1 and FIG. 2, a 3 GPP system primarily includes Home Subscriber Server (HSS)/Home Location Register (HLR), 3 GPP AAA Server, 3 GPP AAA Proxy, WAG, PDG, Charging Gateway (CGw)/Charging information Collecting Function (CCF) and Online Charging System (OCS). WLAN UE, WLAN access network, and all the entities of the 3 GPP system together construct a 3 GPP-WLAN inter-working network, which can be used as a WLAN service system. In this service system, 3 GPP AAA Server is in charge of the authentication, authorization, and accounting of a WLAN UE, collecting the charging information sent from the WLAN access network and transferring said charging information to the charging system; the PDG is in charge of the transmission of the user's data from the WLAN access network to the 3 GPP network or other packet switching networks; and the charging system is in charge of receiving and recording the user's charging information transferred from the network, and the OCS takes charge of instructing the network to periodically transmit online charging information in accordance with the expenses of the online charged users, meanwhile making statistics and controlling the network.

At present, there is no definite restrictive rule on the WLAN UE after accessing the WLAN. As a result, whether or not the currently accessed WLAN UE has subscribed to the service based on the Packet Switched (PS) domain in the Public Land Mobile Network (PLMN), it is able to send messages via WAG to the core network of the PLMN casually. This is detrimental to an operating network, for there are lots of data that may be redundant or illegal, which will not only increase unnecessary load of the network, but also be harmful to the security management of the entire network and a proper charging. On the other hand, the network may also send to WLAN UE redundant or illegal information which the user does not need, which will bring unnecessary interference and trouble to the user as well and may even affect the security of the legal WLAN UE. So far, however, no specific solution has been put forward so as to prevent the interference and threat of illegal information to the network and the legal WLAN UE.

SUMMARY OF THE INVENTION

In accordance with one aspect of the disclosure, a wireless local area network access gateway (WAG) is provided which can not only implement its own functions but can also filter the received data and prevent the access of illegal messages, thereby improving the security of the PLMN and the legal UE and reducing the load thereof.

In accordance with another aspect of the disclosure, a method is useful for ensuring the network security by utilizing the disclosed WAG, which is able to discriminate, filter, and shield data packets and prevent the interference and threat of illegal messages to network operation as much as possible, thereby ensuring the security and reliability of the network and reducing the load thereof.

In accordance with another aspect of the disclosure, a WAG includes a routing enforcement module for enforcing transmission routes of data packets received by the WAG, a message filtering module, for obtaining and storing packet filtering rules, and filtering data packets received from or sent to a WLAN according to the packet filtering rules; and a charging module, for collecting charging information for data packets passing through the WAG, wherein the message filtering module connects to the routing enforcement module and the charging module, filters data packets received by the WAG, drops the data packets matching at least on of the packet filtering rules stored and outputs the data packets matching no packet filtering rules stored; and after the charging module collects the charging information for the data packets passing through the WAG, the data packets are outputted to a service authentication and authorization unit of a Wireless Local Area Network (WLAN), or a Packet Data Gateway (PDG), or a WLAN user eciuipment (UE).

In accordance with yet another aspect of the disclosure, a method for ensuring network security by utilizing the WAG includes receiving a data packet sent from or to a Wireless Local Area Network (WLAN) user eciuipment (UE) via a WLAN access network; extracting non-encrypted information from the received data packet; matching the obtained non-encrypted information with the stored packet filtering rules, if the non-encrypted information and the packet filtering rules are matching, refusing the subsequent transmission of the received data packet; and if the non-encrypted information and the packet filtering rules are not matching, forwarding the received data packets to a destination.

In accordance with further aspects of the disclosure, the disclosed WAG and method for ensuring network security therewith prevent the interference and threat of illegal messages to the network and WLAN UE because a message filtering module is added to the existing WAG and the added module is able to judge whether to permit the access of various data packets to the network, and because of the critical data-access position of the WAG in the network. As a further result, the security and reliability of the network is ensured and the network load is reduced, which is significant to the safe operation of the network. Furthermore, because various filtering rules configured in the WAG in accordance with the disclosure may be configured in advance or dynamically updated in real-time, the network security is guaranteed and the implementation of the disclosed method is more flexible. Still further, because the filtering function of data packets utilizes the existing device of access gateway, leaving the previous network architecture and processing procedures basically unchanged, the impact on the entire network is trivial and the implementation is straightforward and convenient.

DETAILED DESCRIPTION OF PREFERRED EMBODIMENTS

A number of exemplary embodiments are hereinafter described in detail with reference to the accompanying drawings.

In connection with the use of WAGs in WLANs, the following disclosure is generally directed to configuring a message-filtering mechanism in the WAG, and discriminating, filtering and screening the data packets passing the WAG in accordance with packet filtering rules statically configured or dynamically updated so as to prevent illegal messages from interfering and threatening the operating network and the legal WLAN UE as much as possible, thereby ensuring the security and reliability of both the network and the legal WLAN UE and at the same time reducing the load of the network or the legal WLAN UE. The data packets discussed herein include encapsulated data and control signaling.

Figure 1:
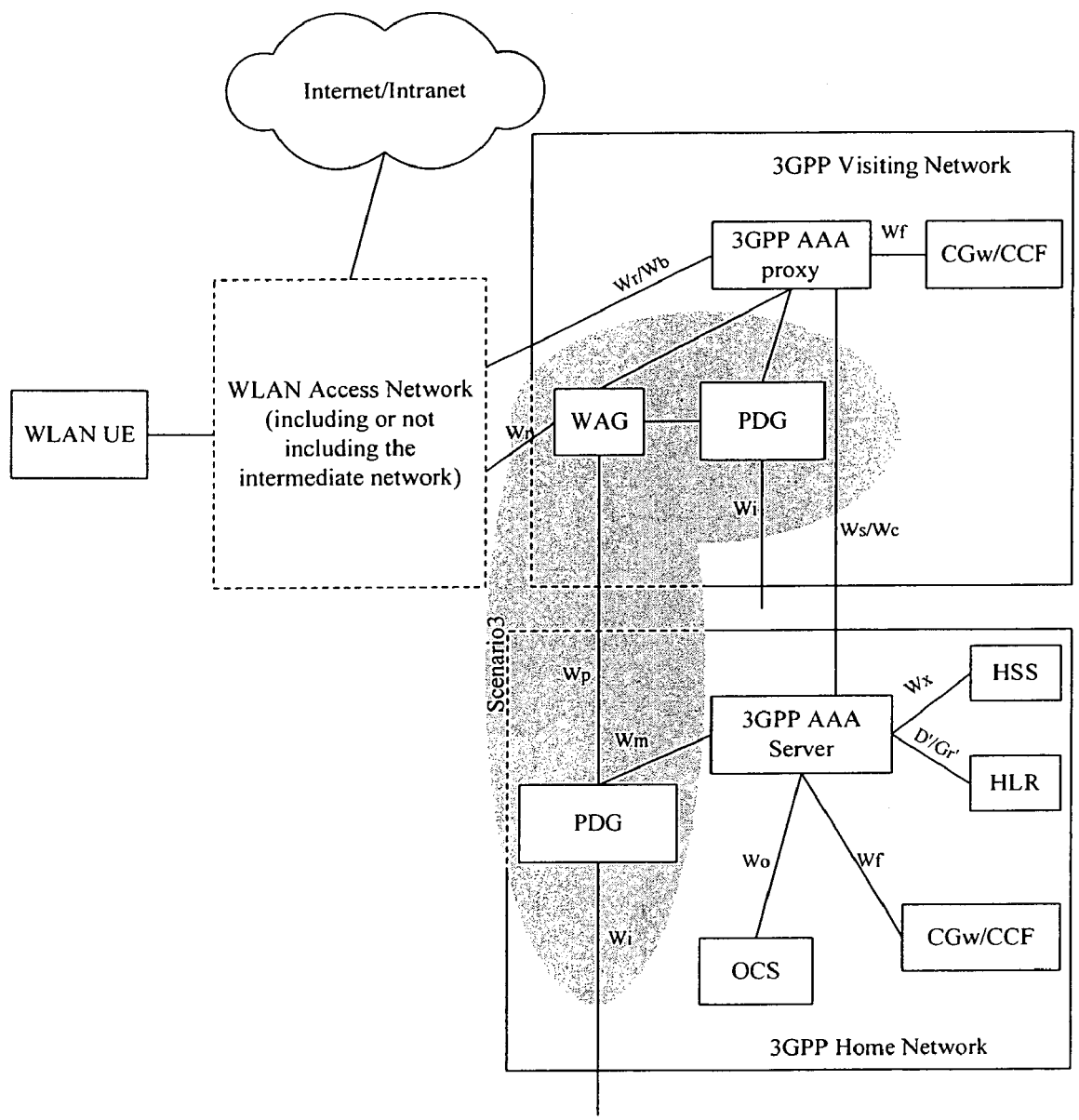
FIG. 1 is a schematic diagram illustrating the architecture of an inter-working network of WLAN and 3 GPP system under roaming circumstances.
Figure 2:
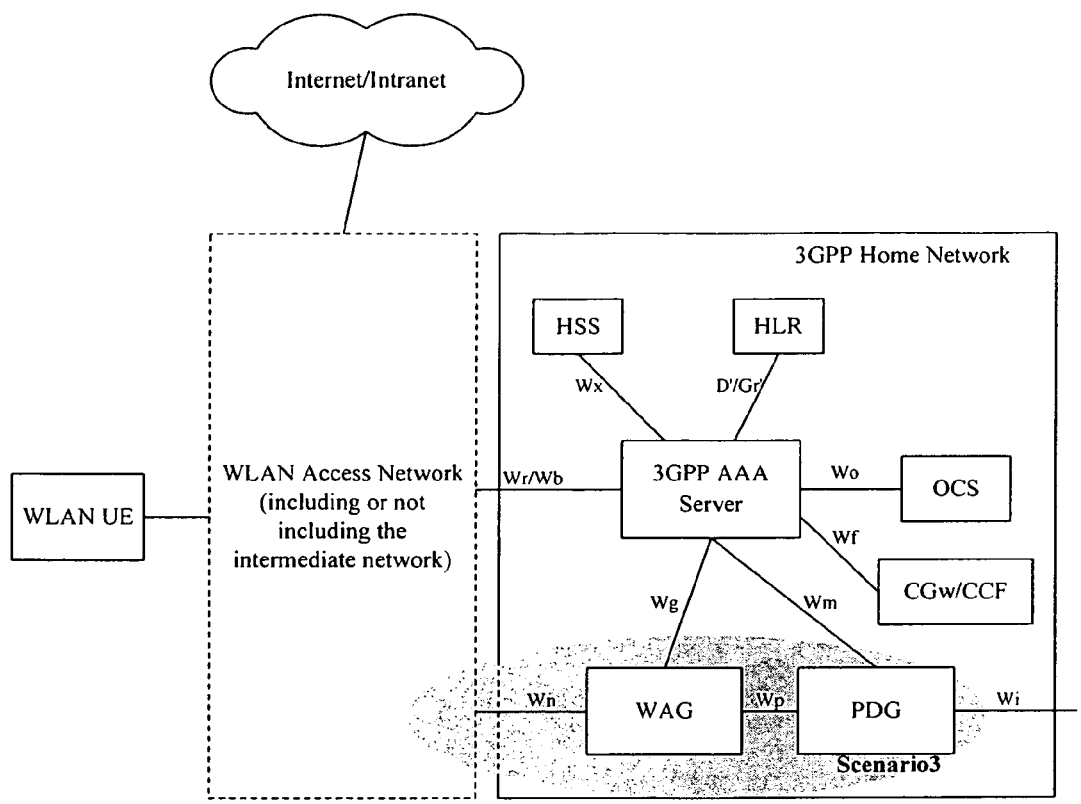
FIG. 2 is a schematic diagram illustrating the architecture of an inter-working network of WLAN and 3 GPP system under non-roaming circumstances.
Figure 3:
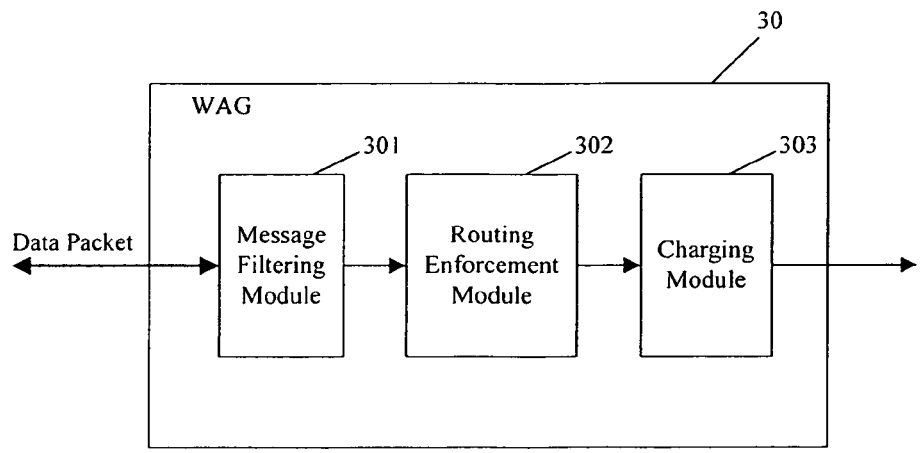
FIG. 3 is a schematic diagram illustrating the composition of a WAG in accordance with an exemplary embodiment of the disclosure.

In accordance with one aspect of the disclosure, the disclosed WAG generally includes a routing enforcement module, a charging module and a message filtering module. The routing enforcement module is used for enforcing the transmission route of the data packets currently passing the WAG to be the designated route, the charging module is used for collecting the charging information of the data packets passing the WAG. These two modules are the existing modules of the WAG. The message filtering module is a new function added in accordance with one aspect of the disclosure, and may be used for acquiring and storing packet filtering rules as well as discriminating, filtering and screening the data packets passing the WAG. This message filtering module has two kinds of connecting relationship with the existing routing enforcement module and charging module:

One kind of connecting relationship is shown in FIG. 3. As shown in FIG. 3, after the data packet sent from the WLAN access network or been sent to the WLAIN access network via the WAG enters WAG 30, the packet will enter the message filtering module 301 first. The message filtering module 301 discriminates and filters the currently received data packet according to the current self-stored packet filtering rules, judges whether to permit the currently received data packet to pass and whether it is needed to screen the data packet, and then sends the filtered data packet to the routing enforcement module 302. The routing enforcement module 302 judges whether needs to make modification to the transmission routing of the data packet. Finally the charging module 303 collects the charging information of the valid data packet passing the WAG.

In this circumference, the message filtering module 301 will connect to the WLAN access network, and at the same time may connect to the PDG, or AAA proxy, or AAA server, or the combination of the three.

Figure 4:
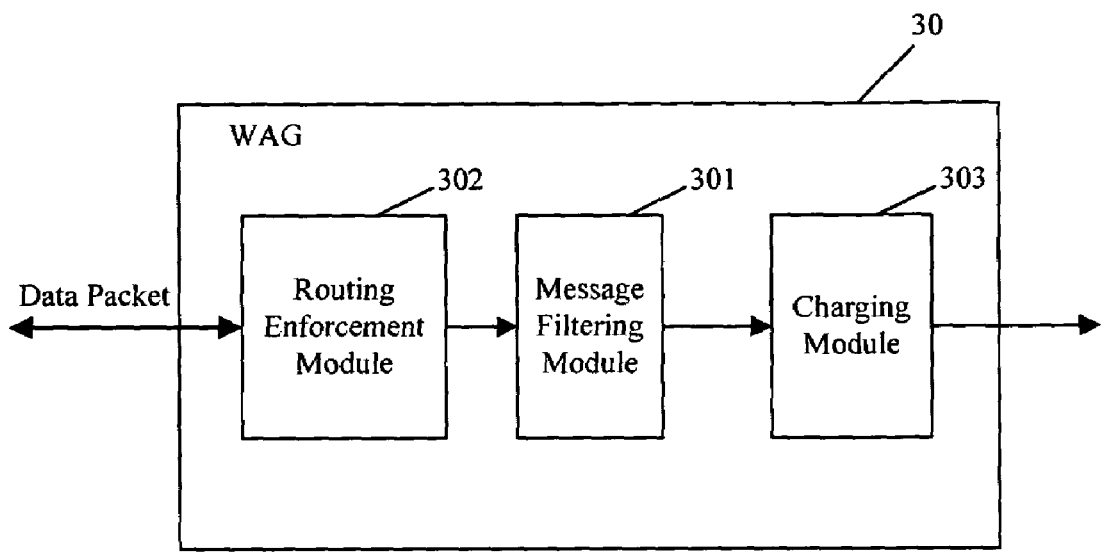
FIG. 4 is a schematic diagram illustrating the composition of a WAG in accordance with another exemplary embodiment.

The other kind of connecting relationship is shown in FIG. 4. As shown in FIG. 4, after the data packet sent from the WLAN access network or been sent to the WLAN access network via the WAG enters WAG 30, it will enter the routing enforcement module 302 first. The routing enforcement module 302 judges whether needs to make modification of the transmission routing of the data packet, and then sends the data packets to the message filtering module 301 after the routing enforcement processing. The message filtering module discriminates and filters the currently received data packets according to the current self-stored packet filtering rules, judges whether to permit the currently received data packet to pass and whether needs to screen the data packets. Finally the charging module 303 collects the charging information of the valid data packets passing the WAG.

Figure 6:
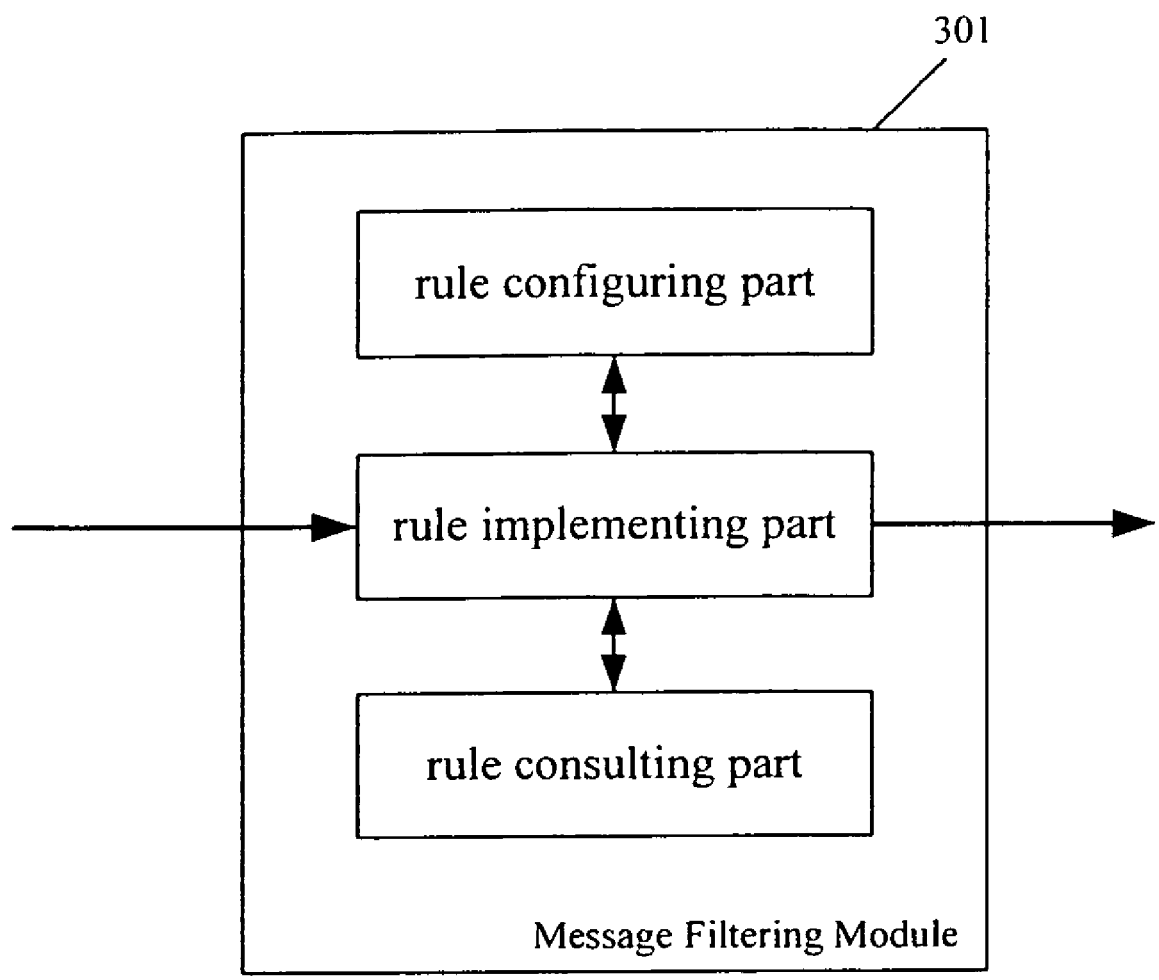
FIG. 6 is a schematic diagram illustrating the structure of the message filtering module shown in FIGS. 3 and 4.

Depending on the different functions accomplished, the message filtering module may be further divided into: a rule configuring part for storing the statically configured packet filtering rules, which can be pre-configured; a rule consulting part for acquiring the packet filtering rules by consulting with other network elements in the WLAN and storing these dynamically updated packet filtering rules; a rule implementing part for processing the currently received data packets according to the current self-stored packet filtering rules. FIG. 6 is a schematic diagram illustrating the structure of the message filtering module shown in FIGS. 3 and 4. According to FIG. 6, the rule configuring part and the rule consulting part are both connected to the rule implementing part. The rule implementing part receives the data packets to be processed, acquires the current packet filtering rules in the WAG from the rule configuring part or the rule consulting part, and then outputs the data packets been processed according to the packet filtering rules. The rule consulting part may further connect to a service authorization unit in WLAN, such as AAA server, or connect to the PDG, so as to consult with the AAA server or PDG whenever necessary, acquire and update the packet filtering rules stored in the WAG, or to update the currently stored packet filtering rules in accordance with the instruction from the network devices like AAA server or PDG. The updating process here includes such operations as adding, deleting, and modifying.

When the message filtering module is connected with the routing enforcement module adopting the first connecting relationship, the rule implementing part of the message filtering module will take the part of the input/output port of the WAG, connecting on one hand with the WLAN access network, on the other hand with the PDG, or AAA proxy, or AAA server, or the combination of the three. If it is needed for the WLAN UL to configure the packet filtering rules, the rule configuring part or the rule consulting part will also connect to the WLAN access network.

Figure 5:
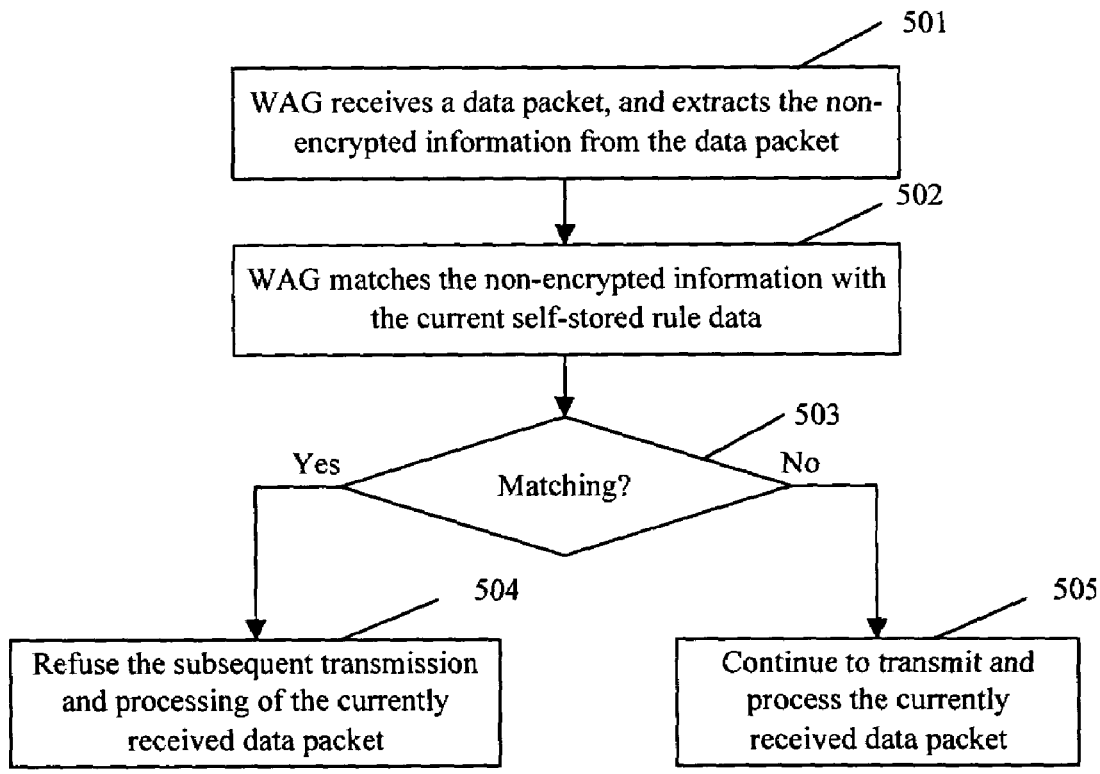
FIG. 5 is the implementation flowchart of the method in accordance with one aspect of the disclosure.

As shown in FIG. 5, an implementation procedure of the method in accordance with one aspect of the disclosure includes the following steps.

Step 501: the WAG receiving a data packet sent from a WLAN UE via the WLAN access network or a data packet sent to the WLAN access network, and extracting the non-encrypted information from the currently received data packet.

The non-encrypted information here refers to the head information of an IP packet, or the head information of various protocol data packet encapsulated in an IP packet, for instance, transmission protocol head, tunnel protocol head, and etc., or the combination of the above information. More specifically, the head of an IP packet includes the source IP address, destination IP address, port address, and MAC address, while the non-encrypted information within an IP packet includes message identifier, message name, UDP/TCP port number, tunnel label, and tunnel type. The WAG may first parse the head of an IP packet, and then parse the non-encrypted information within the IP packet.

Step 502: the WAG matching the non-encrypted information acquired in step 501 with the current self-stored packet filtering rules.

The current self-stored packet filtering rules in the WAG may be acquired in various ways, for instance, by pre-setting statically, or by consulting with such network elements as the AAA server or PDG whenever necessary, or by being updated at the direct instruction from such network elements as the AAA server or PDG, or by being configured by the UE.

Steps 503–505: judging whether the non-encrypted information and the packet filtering rules are matching or not. If they are matching, then refusing the subsequent transmission of the currently received data packet, and otherwise continuing the transmission of the currently received data packet. In fact, these steps are to judge whether the data packet being processed conforms with the requirement for transmission, for instance, whether the packet is from a certain address, whether it is to a certain address, whether it is a legal tunnel type, whether it is an authorized tunnel identifier, and etc.

Embodiment 1. In a 3 GPP-WLAN interactive network, the external IP address of a WLAN UE is assigned by the PLMN, the tunneling protocol adopted by the WLAN UE and PDG is L2TP/IPSEC, and the following packet filtering rules are set in the WAG with a message filtering module in accordance with one aspect of the disclosure:

1) messages with the source IP addresses belonging to the address segment 10.11.30.XX are not permitted to pass this WAG.
2) messages with the source IP addresses belonging to the address segment 10.11.31.XX, whose destination address is not 127.11.20.1X, are not permitted to pass this WAG.

In some cases, packet filtering rule 1) may be used to prevent a certain set of source addresses without authorization from sending undesired information to the WLAN, and packet filtering rule 2) may be used to set a further provision that a certain set of source addresses is only allowed to send information to certain destination addresses, for instance, these source addresses may only enjoy the service provided by certain PDGs and are only allowed to send information to designated PDGs. Otherwise, the information sent there from would be filtered as invalid information, thereby preventing invalid messages from entering the WLAN as much as possible.

In terms of packet filtering rule 1), after receiving the current data packet, the WAG first extracts the source IP address from this data packet, and then judges whether the extracted source IP address belongs to the address segment 10.11.30.XX. If yes, the data packet will not be permitted to pass, i.e. this WAG will no longer continue the transmission or processing of this data packet. If not, the WAG will continue the transmission or processing of this packet.

In terms of packet filtering rule 2), after receiving the current data packet, the WAG first extracts the source IP address and destination IP address from this data packet, and then judges whether the extracted source IP address belongs to the address segment 10.11.30.XX. If not, the data packet will not be permitted to pass, i.e. this WAG will no longer continue the transmission or processing of this data packet. If yes, the WAG further judges whether the destination IP address is 127.11.20.1X. If it is not 127.11.20.1X, the packet will not be permitted to pass, i.e. this WAG will not continue the transmission or processing of this packet. If it is 127.11.20.1X, the WAG will continue the transmission or processing of this packet.

In this embodiment, it is possible to further analyze the packet filtering rules behind the head of IP packet: if what is adopted immediately the head inside the IP packet is not a L2TP tunnel, or the message is not a message of tunneling consultation, refuse to transmit the currently received message. Obviously, it is possible to set the permission for tunnels of other types, for instance, permit the message of GRE tunneling protocol to be transmitted continually; or permit at the same time messages of several other specific tunneling protocols.

All the statically set packet filtering rules in connection with the disclosed method and WAG may be aimed at a user group rather than a certain user.

Embodiment 2. Apart from the statically set packet filtering rules, it is possible to dynamically set the packet filtering rules. The dynamically setting may be aimed at a user group or an individual user.

A typical exemplary application may involve the following. After a user is authorized to access a certain PDG, for instance, PDG 1, the WLAN will send the packet filtering rules to the WAG, permitting the message from the source address corresponding to the currently authorized user to the address corresponding to PDG 1 to pass the WAG. Specifically, the packet filtering rules can be implemented by making decisions depending on the IP addresses and tunnel number, and the process of deciding and matching is basically the same as Embodiment 1. In this embodiment, it is possible as well to further examine whether the tunneling protocol encapsulation is legal, whether the message type is legal, and etc.

It should be appreciated that the foregoing description set forth a number of preferred embodiments of the present invention and, thus, is to be regarded as illustrative rather than restrictive.

The invention claimed is:

1. A Wireless Local Area Network Access Gateway (WAG), comprising:
   a routing enforcement module for enforcing transmission routes of data packets received by the WAG;
   a message filtering module for obtaining and storing packet filtering rules for filtering the data packets, and for filtering both data packets sent to a Wireless Local Network (WLAN) and data packets received from the WLAN according to the packet filtering rules; and
   a charging module for collecting charging information for data packets passing through the WAG, wherein:
   the message filtering module connects to the routing enforcement module and the charging module, filters the data packets received by the WAG, drops the data packets matching at least one of the stored packet filtering rules and outputs the data packets matching none of the stored packet filtering rules;
   after the charging module collects the charging information for the data packets passing through the WAG, the data packets are outputted to a service authentication and authorization unit of the WLAN, or a Packet Data Gateway (PDG), or WLAN user equipment (UE).

2. The WAG according to claim 1, wherein one port of the message filtering module is an input/output of the WAG while another port of the message filtering module is connected to an input of the routing enforcement module, and the message filtering module is indirectly connected to the charging module through the routing enforcement module, and the data packets filtered by the message filtering module are the data packets received from or sent to a WLAN access network.

3. The WAG according to claim 1, wherein an input of the message filtering module is connected to an output of the routing enforcement module, wherein an output of the message filtering module is connected to an input of the charging module, and wherein the data packets filtered by the message filtering module are the data packets undergoing routing enforcement processing by the routing enforcement module.

4. The WAG according to claim 1, wherein the message filtering module comprises:
   a rule configuring part for storing statically configured packet filtering rules;
   a rule consulting part for consulting with external network elements of the WLAN and storing dynamically updated packet filtering rules; and,
   a rule implementing part for filtering data packets in accordance with the packet filtering rules;
   wherein the rule configuring part and the rule consulting part are both connected to the rule implementing part, and the rule implementing part receives the data packets to be filtered, acquires the packet filtering rules from the rule configuring part or the rule consulting part, and drops the data packets matching the packet filtering rules and outputs the data packets not matching the packet filtering rules.

5. The WAG according to claim 4, wherein the message filtering module further connects to the service authentication and authorization unit, or the PDG, or the service authentication and authorization unit and the PDG, and wherein the packet filtering rules are generated by the service authentication and authorization unit, or the PDG, or the service authentication and authorization unit and the PDG.

6. The WAG according to claim 5, wherein the service authentication and authorization unit refers to an authentication, authorization and accounting (AAA) server, or an AAA proxy and AAA server.

7. A method for ensuring network security by utilizing a Wireless Local Area Network Access Gateway (WAG), comprising:
   receiving both data packets sent from and data packets sent to user equipment (UE) of a wireless local area network (WLAN) via a WLAN access network;
   extracting respective non-encrypted information from each data packet of the received data packets;
   matching the non-encrypted information with packet filtering rules; and
   if the non-encrypted information and the packet filtering rules are matching, refusing subsequent transmission of the data packet; and
   if the non-encrypted information and the packet filtering rules are not matching, forwarding the data packet to a destination address.

8. The method according to claim 7, further comprising pre-configuring the packet filtering rules in the WAG indicating which kind of data packets are not permitted to pass.

9. The method according to claim 7, further comprising:
   obtaining and storing the packet filtering rules for filtering data packets generated by an authentication, authorization and accounting (AAA) server or a Packet Data Gate (PDG) in the WLAN; and
   updating the packet filtering rules dynamically in accordance with an instruction from the AAA server or the Packet Data Gateway (PDG) in the WLAN or a consultation with the AAA server or the PDG in the WLAN.

10. The method according to claim 7, wherein the non-encrypted information comprises at least any one of a source IP address, a destination IP address, a port address, a Media Access Control (MAC) address, a message identifier, a message name, a Transfer Control Protocol (TCP) port number, and a tunnel label.

* * * * *